US009387616B2

(12) United States Patent
Olaru

(10) Patent No.: US 9,387,616 B2
(45) Date of Patent: Jul. 12, 2016

(54) HOT RUNNER INJECTION MOLDING APPARATUS WITH ADDITIONAL CONTROLLER

(71) Applicant: Otto Männer Innovation GmbH, Bahlingen (DE)

(72) Inventor: Gheorghe George Olaru, Freiburg (DE)

(73) Assignee: Otto Männer Innovation GmbH, Bahlingen (DE)

( * ) Notice: Subject to any disclaimer, the term of this patent is extended or adjusted under 35 U.S.C. 154(b) by 332 days.

(21) Appl. No.: 13/959,656

(22) Filed: Aug. 5, 2013

(65) Prior Publication Data

US 2014/0037779 A1 Feb. 6, 2014

Related U.S. Application Data

(60) Provisional application No. 61/679,681, filed on Aug. 3, 2012, provisional application No. 61/680,272, filed on Aug. 6, 2012.

(51) Int. Cl.
*B29C 45/76* (2006.01)

(52) U.S. Cl.
CPC ......... *B29C 45/76* (2013.01); *B29C 2945/7604* (2013.01); *B29C 2945/76274* (2013.01); *B29C 2945/76759* (2013.01); *B29C 2945/76993* (2013.01)

(58) Field of Classification Search
CPC ...................... B29C 45/76; B29C 2945/76274; B29C 2945/76759; B29C 2945/7604; B29C 2945/76993
See application file for complete search history.

(56) References Cited

U.S. PATENT DOCUMENTS

| 5,062,052 A | 10/1991 | Sparer et al. |
| 5,325,287 A | 6/1994 | Spahr et al. |
| 5,518,389 A | 5/1996 | Nonomura et al. |
| 5,772,933 A | 6/1998 | Kotzab |
| 5,792,395 A * | 8/1998 | Ito .......................... B29C 45/76 264/328.1 |
| 5,795,511 A | 8/1998 | Kalantzis et al. |
| 5,811,134 A * | 9/1998 | Takizawa .............. B29C 45/762 264/40.1 |
| 5,853,631 A | 12/1998 | Linehan |

(Continued)

FOREIGN PATENT DOCUMENTS

| DE | 19909307 A1 * | 9/1999 |
| DE | 102004051106 A1 | 10/2004 |

(Continued)

*Primary Examiner* — Yogendra Gupta
*Assistant Examiner* — Emmanuel S Luk
(74) *Attorney, Agent, or Firm* — McAndrews, Held & Malloy, Ltd.

(57) ABSTRACT

A control system for a hot runner injection molding system includes a first injection molding machine controller that receives signals from injection molding machine sensors and a second hot runner apparatus controller that receives signals from hot runner apparatus sensors. A third controller that is remote from the injection molding machine controller and the hot runner apparatus controller receives data from the other controllers that is related to the signals from the aforementioned sensors and to transmit commands to the controllers that are related to the operation of the injection molding machine and the hot runner apparatus. The third controller can be linked to several first hot runner controllers and several second injection molding machine controllers. The first hot runner controllers can be provided by the same manufacturer or different manufacturers. The second injection molding machine controllers can be provided by the same manufacturer or different manufacturers.

20 Claims, 5 Drawing Sheets

(56) References Cited

U.S. PATENT DOCUMENTS

| | | | |
|---|---|---|---|
| 5,870,698 A | 2/1999 | Riedel et al. | |
| 5,898,591 A * | 4/1999 | Hettinga | B29C 45/768 425/162 |
| 6,000,831 A | 12/1999 | Triplett | |
| 6,061,603 A | 5/2000 | Papadopoulos et al. | |
| 6,073,059 A * | 6/2000 | Hayashi | B29C 37/00 700/181 |
| 6,145,022 A * | 11/2000 | Takizawa | B29C 45/76 700/200 |
| 6,275,741 B1 | 8/2001 | Choi | |
| 6,311,101 B1 * | 10/2001 | Kastner | B29C 45/76 700/17 |
| 6,311,191 B1 | 10/2001 | Retallick | |
| 6,381,512 B1 * | 4/2002 | Saitou | B29C 45/76 700/200 |
| 6,421,577 B1 | 7/2002 | Triplett | |
| 6,529,796 B1 | 3/2003 | Kroeger et al. | |
| 6,649,095 B2 | 11/2003 | Buja | |
| 6,904,333 B2 * | 6/2005 | Morimura | B29C 45/76 340/539.11 |
| 6,913,453 B2 * | 7/2005 | Kalantzis | B29C 45/1774 264/328.14 |
| 6,936,199 B2 | 8/2005 | Olaru | |
| 6,947,800 B2 * | 9/2005 | Flanagan | B21C 51/00 700/108 |
| 6,973,356 B2 | 12/2005 | Bieber | |
| 6,980,882 B2 | 12/2005 | Yamazaki et al. | |
| 7,058,475 B2 | 6/2006 | Erhardt | |
| 7,072,735 B2 | 7/2006 | Smith | |
| 7,128,548 B2 | 10/2006 | Manner | |
| 7,139,636 B2 * | 11/2006 | Foreman | B29D 11/00 425/808 |
| 7,258,536 B2 | 8/2007 | Olaru et al. | |
| 7,418,992 B2 | 9/2008 | Pilavdzic | |
| 7,580,771 B2 | 8/2009 | Quail et al. | |
| 7,585,166 B2 | 9/2009 | Buja | |
| 7,671,304 B2 | 3/2010 | Nguyen | |
| 7,722,351 B2 | 5/2010 | Feick et al. | |
| 7,896,636 B2 * | 3/2011 | Shioiri | B29C 45/766 425/138 |
| 7,931,455 B2 | 4/2011 | Tabassi | |
| 7,963,762 B2 | 6/2011 | Tabassi et al. | |
| 7,988,445 B2 | 8/2011 | Tabassi et al. | |
| 8,025,496 B2 * | 9/2011 | Eikenberry | B29C 45/17 425/169 |
| 8,028,099 B2 | 9/2011 | Batke et al. | |
| 8,100,689 B2 | 1/2012 | Bouti et al. | |
| 8,142,182 B2 | 3/2012 | Feick et al. | |
| 8,165,714 B2 | 4/2012 | Mier et al. | |
| 8,883,054 B2 * | 11/2014 | Starkey | B29C 45/76 264/40.1 |
| 8,899,955 B2 * | 12/2014 | Starkey | G05B 19/406 264/40.1 |
| 2002/0031567 A1 * | 3/2002 | Magario | B29C 45/76 425/135 |
| 2002/0188374 A1 * | 12/2002 | Urbanek | B29C 45/76 700/200 |
| 2003/0003176 A1 * | 1/2003 | Foreman | B29C 35/08 425/135 |
| 2003/0018829 A1 * | 1/2003 | Carney | G06F 9/542 719/321 |
| 2003/0049342 A1 * | 3/2003 | Foreman | B29C 35/0288 425/135 |
| 2003/0139176 A1 * | 7/2003 | Fujiwara | H04L 67/04 455/420 |
| 2004/0088073 A1 | 5/2004 | Yamazaki et al. | |
| 2004/0128020 A1 * | 7/2004 | Fischbach | B29C 45/76 700/200 |
| 2004/0201602 A1 | 10/2004 | Mody et al. | |
| 2004/0247724 A1 | 12/2004 | Manner | |
| 2004/0258787 A1 | 12/2004 | Olaru et al. | |
| 2005/0053684 A1 * | 3/2005 | Pitscheneder | B29C 45/14778 425/144 |
| 2005/0067128 A1 * | 3/2005 | Korneff | B22D 17/32 164/4.1 |
| 2005/0240303 A1 | 10/2005 | Smith | |
| 2005/0283271 A1 * | 12/2005 | Dachs | B29C 47/92 700/200 |
| 2006/0081719 A1 | 4/2006 | Nguyen | |
| 2006/0082009 A1 | 4/2006 | Quail et al. | |
| 2006/0082010 A1 * | 4/2006 | Saggese | B22D 17/007 264/40.5 |
| 2007/0186144 A1 | 8/2007 | Stange et al. | |
| 2008/0290541 A1 | 11/2008 | Baumann | |
| 2009/0100962 A1 | 4/2009 | Uracz et al. | |
| 2010/0285170 A1 * | 11/2010 | Galati | B29C 45/1775 425/562 |
| 2010/0320632 A1 | 12/2010 | Starkey | |
| 2011/0018172 A1 | 1/2011 | Bouti et al. | |
| 2011/0106284 A1 | 5/2011 | Catoen et al. | |
| 2011/0154243 A1 | 6/2011 | Styga et al. | |
| 2011/0184550 A1 | 7/2011 | Mier et al. | |
| 2011/0193253 A1 * | 8/2011 | Polk | B29C 31/006 264/40.7 |
| 2011/0304075 A1 | 12/2011 | Catoen et al. | |
| 2011/0311618 A1 | 12/2011 | Amighi et al. | |
| 2011/0316180 A1 | 12/2011 | Starkey | |
| 2012/0133601 A1 | 5/2012 | Marshall et al. | |
| 2012/0231103 A1 | 9/2012 | Catoen | |
| 2014/0037779 A1 | 2/2014 | Olaru | |
| 2015/0086667 A1 | 3/2015 | Grimm | |

FOREIGN PATENT DOCUMENTS

| | | |
|---|---|---|
| DE | 102004052499 A1 | 10/2004 |
| DE | 112008001188 T5 | 4/2008 |
| EP | 2051825 B1 | 6/2012 |
| WO | 0240247 A1 | 5/2002 |
| WO | 2012000924 A1 | 5/2012 |
| WO | 2012082291 A1 | 6/2012 |
| WO | 2014106297 A1 | 7/2014 |

* cited by examiner

HOT RUNNER INJECTION MOLDING APPARATUS WITH ADDITIONAL CONTROLLER

CROSS-REFERENCE TO RELATED APPLICATIONS

This application is the non-provisional application of provisional applications 61/679,681, filed Aug. 3, 2012, and 61/680,272, filed Aug. 6, 2012, both of which are hereby incorporated by reference in their entirety.

FIELD

This invention is related to hot runner injection molding systems and methods of injection molding. More particularly, this invention is related to hot runner injection molding systems having controllers and methods of controlling hot runners systems.

BACKGROUND

It is known to use injection molding machines and injection molding systems to manufacture molded parts in large quantities and at a high speed.

The injection molding machines include at least one machine controller coupled to and in communication with various parts and sensors associated with the injection molding machine. Reference is made in this regard to U.S. Pat. Nos. 5,062,052, 6,980,882, and 6,275,741, that are all incorporated herein by reference in their entirety.

Injection molding systems using hot runners rather than cold runners are used more and more often to meet these criteria and higher quality requirements for the molded parts.

These hot runner injection molding system include in general an injection molding machine such as mentioned above, a hot runner system and a mold. In many instances, additional or auxiliary equipment/components are used to improve the process or to add functions, such as additional injection units, different process sensors, robots, conveyors, cameras and computers.

There are two main categories of hot runner systems, hot runner systems using open nozzles and hot runner systems using valve gated nozzles. In both cases, the temperature in the hot runner nozzle requires more attention because of the importance of the heat profile along the hot runner nozzle and of the temperature of the molten material entering the cavity and in the cavity. In the case of the valve gated nozzles, additional attention needs to be paid to the movement of the valve pins. In many applications, pressure sensors located in the hot runner and/or in the mold are used to better monitor and influence the molding process.

It is known to use hot runner controllers to monitor and influence the molding process from the hot runner side. Reference is made in this regard to U.S. Pat. Nos. 5,518,389, 5,795,511, 6,421,577, 6,529,796, 7,128,548, 7,671,304, 7,072,735, 7,580,771, 8,165,714, U.S. Pub. Appl. No. 20040258787, U.S. Pub. Appl. No. 201103116180, U.S. Pub. Appl. No. 20120231103, and WO 2012/082 291 that are all incorporated herein by reference in their entirety.

The state of the art shows that both the injection molding machine controllers and the hot runner and or mold controllers are manufactured by a large number of suppliers. These controllers include numerous proprietary, customized and non-standard hardware, architecture software and communication means that make it difficult for the users to manage the injection molding equipment and the manufacturing process efficiently and accurately and to communicate and collect all data needed in the manufacturing process.

There is a need to further increase the accuracy, efficiency, the range of functions and the communication capabilities of the hot runner controllers and of the related components/devices/equipment of the hot runner the injection molding systems.

There is a further need to provide selective and or customized control access to the hot runner injection molding systems and their controllers and associated devices using improved stationary or mobile control devices.

There is a further need to provide a user control means to have access to control data provided by hot runner and/or machine controllers manufactured by various makers that have different architectures and that are located in the same injection molding premises.

There is a further need for selective and/or customized control access to the hot runner injection molding systems and their controllers and associated devices using improved stationary or mobile control devices.

There is a further need to provide a fail-safe/fallback or a redundant controller means to prevent down-time, unexpected errors or unexpected events caused by a failure in the controllers used in hot runner the injection molding systems.

There is a further need to provide improved controllers to be used in clean-rooms or other kinds of industrial environments of the hot runner injection molding systems.

SUMMARY

In an aspect, a control system for a hot runner injection molding system includes a first injection molding machine controller that receives signals from a plurality of injection molding machine sensors on an injection molding machine and a second hot runner apparatus controller that receives signals from a plurality of hot runner apparatus sensors on a hot runner apparatus. A third controller that is remote from the injection molding machine controller and the hot runner apparatus controller is configured to receive data from the injection molding machine controller and the hot runner apparatus controller that is related to the signals from the injection molding machine sensors and the hot runner apparatus sensors and to transmit commands to the injection molding machine controller and the hot runner apparatus controller that are related to the operation of the injection molding machine and the hot runner apparatus. The third controller can be linked to several first hot runner controllers and several second injection molding machine controllers. The first hot runner controllers can be provided by the same manufacturer or different manufacturers. The second injection molding machine controllers can be provided by the same manufacturer or different manufacturers. The third controller is able to communicate both ways with controllers made by any third party manufacturer.

For the purpose of understanding the description and claims herein, the hot runner controller mentioned in the description and known in the art is called a first controller, the injection molding controller mentioned in the description and known in the art is called a second controller. The new controller according to embodiments of this invention is called a third controller.

For the purpose of understanding the description and claims herein, the terms "user interface" or "UI", "graphic user interface" or "GUI", "human machine interface" or "HMI" are in general equivalent and describe devices that are able to perform in general the same functions and the same tasks that allow a user to interact with the electronic devices and components of a hot runner injection molding system. Such terms are known and used in the art of hot runner injection molding.

For the purpose of understanding the description and claims herein, the terms "programmable logic controller" or "PLC", "industrial personal computer" or "IPC" are intended to be equivalent to each other and, for the purposes of the embodiments described herein, have the same meaning and function.

For the purpose of understanding the description and claims herein, the terms "control panel" and "display" have equivalent or the same meaning and function For the purpose of understanding the description and claims herein, the terms "portable general purpose use computer", "tablet computer" "mobile computer" have equivalent or the same meaning and function For the purpose of understanding the description and claims herein, the terms "controller" means a device that is able to communicate with another device via wires or wireless standard communication lines.

For the purpose of understanding the description and claims herein, the terms "operating system" means a general use or a customized software application that enables the use of a controller.

DETAILED DESCRIPTION OF THE INVENTION

Figure 1A:
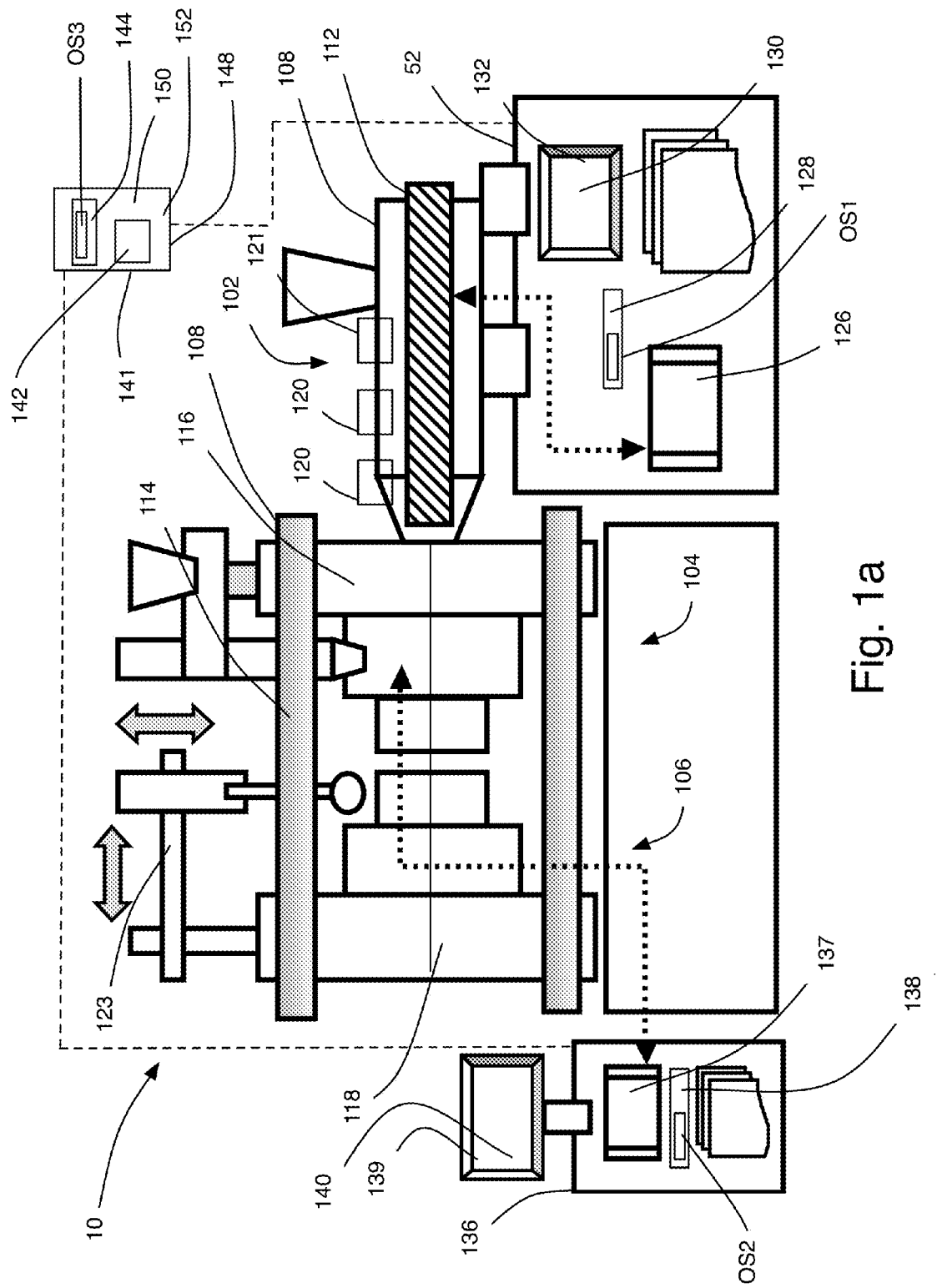
FIG. 1a shows a known injection molding system having separate injection molding and hot runner controllers.

Reference is made to FIG. 1a, which shows a portion of a hot runner injection molding system 100 according to an embodiment of the invention. The injection molding system 100 includes an injection molding machine 102, a hot half 104 and a cold half 106. The injection molding machine 102 includes an injection unit 108 that is heated as known in the art by a plurality of heaters (not shown) and a clamping unit 110 (not shown). The injection unit 108 may include a motor driven screw 112. The clamping unit 110 may include a plurality of hydraulic rams (not shown) 114 that bring a first machine platen 116 and a second machine platen 118 towards and away from each other as they ride tie-bars 114. A plurality of machine processing sensors 120 may be provided to detect, among other things, at least one of the temperature of molten material being injected by the injection unit 108, the pressure of the molten material, motor current draw on the motor that powers the screw 112 and any other suitable processing information. The screw 112 is an example of a temperature conditioning element to help provide molten material. The sensors 120 are examples injection molding machine sensors and any other type of sensor may additionally or alternatively be provided.

As further shown in FIG. 1a, an additional or a secondary injection unit (122) can be used to deliver a second molten material, or the same material in having a different characteristic such as a different color, according to an embodiment of the invention. The secondary injection unit (122) can be located on either of the machine platens (116,118) as shown in FIG. 1a or it can be located on either the cold half (106) or the hot half (104) of the mold.

Figure 1B:
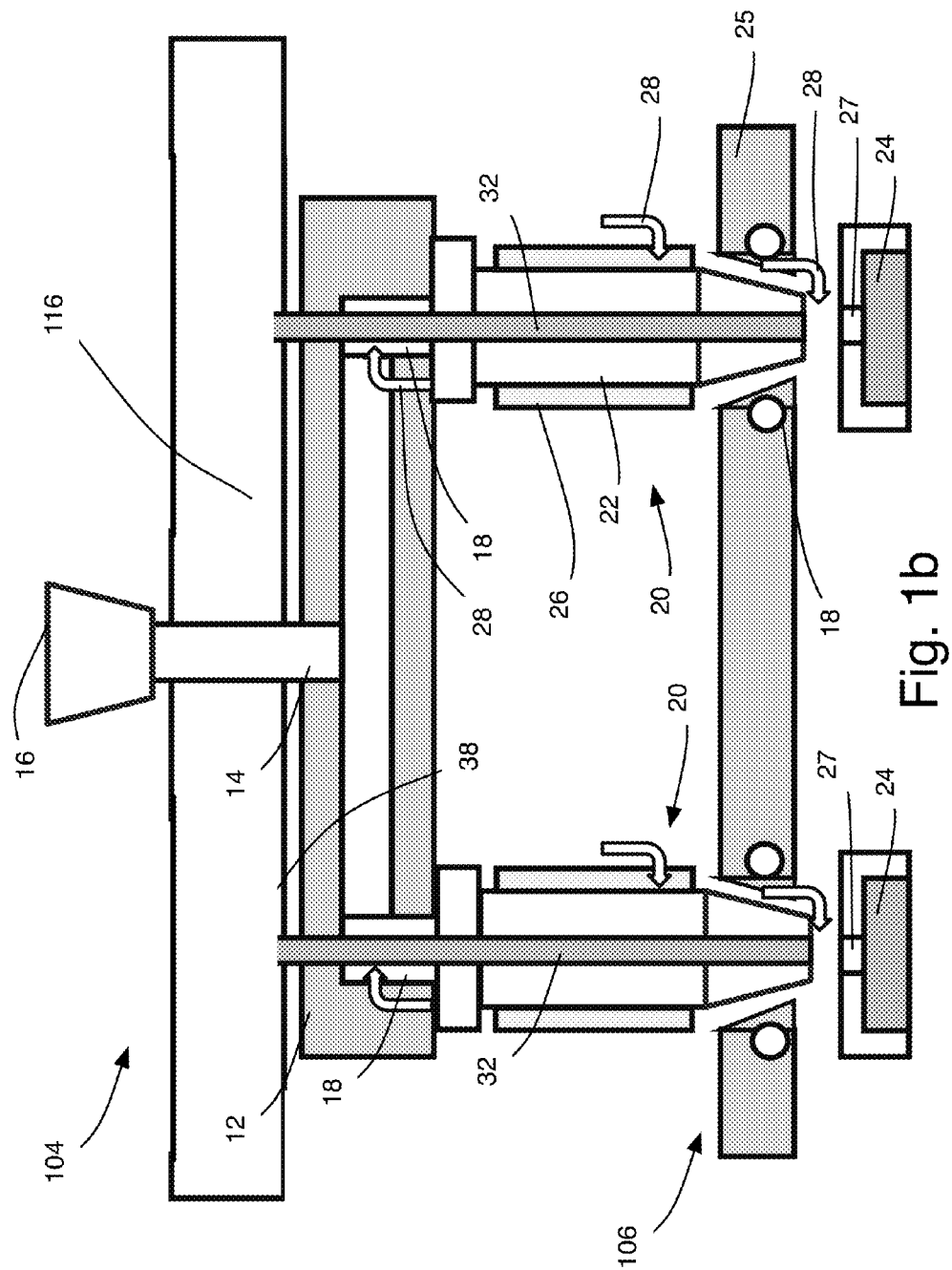
FIG. 1b shows a known hot runner system and a cold half.

Referring to FIG. 1b, the hot half 104 includes a hot runner apparatus 10 which includes an injection manifold 12 having an inlet melt channel 14 that receives molten material (e.g. resin) from an injection nozzle barrel 16 (which receives molten material from the injection unit (108) (FIG. 1a) and a plurality of output melt channels 18 fluidically connected to and downstream from the inlet melt channel 14.

The hot half 104 further includes a plurality of hot runner nozzles 20 associated with the manifold output melt channels 18. Each nozzle 20 includes a nozzle body 22 located in nozzle bores (not shown) that are made on plate 25 for transporting molten material from one of the output melt channels (not shown) to a mold cavity 24 in separate a mold plate not shown 25 (which is connected to the second platen 118 shown in FIG. 1a). Each mold cavity 24 is part of the cold half 106 and has a mold gate 27 associated therewith (and in some cases a plurality of mold gates are associated with each mold cavity 24). Each nozzle 20 further includes a nozzle heater 26 for heating molten material in the nozzle body 22 and optionally one or more sensors 28, such as thermocouples for sensing temperatures associated with the molten material in the nozzle body 22 and temperatures associated with the nozzle body 22 (and/or any other suitable processing data). The nozzle heaters 26 are examples only and any other suitable temperature conditioning elements may additionally or alternatively be provided. These thermocouples 28 are examples only and any other suitable hot runner apparatus sensors may additionally or alternatively be provided. The nozzle body 22 may be made from one or more components as is known in the art.

According to an embodiment of the invention a plurality of valve pins 32 (which may be referred to as blocking elements) are optionally provided and are associated with the hot runner nozzles 20 (wherein each nozzle 20 has one valve pin 32 passing through it). The valve pins 32 are optionally movable to control the flow of molten material through the gates 27 into the mold cavities 24.

According to another embodiment of the invention each nozzle 20 has an open melt channel as known in the art (not shown) that is without the valve pin 32 passing through it. The flow of molten material through nozzles 20 are controlled by heaters 26 and cooling channels 18 near the mold gate 27.

According to an embodiment of the invention, the hot runner injection molding system 10 includes is a modular control systems made of several interlinked specialized sub-controllers 52, 136, 141. Each sub-controller 52, 136, 141 has control elements that provide and enable specific functions that are the same or are not present in the other sub-controllers.

According to an embodiment of the invention, machine controller 52 can incorporate the hot runner controller 136 as a single unit having different hot runner related modules and injection molding machine related modules that are linked to a common or a single user interface (or equivalent graphic user interface GUI or an equivalent human machine interface (HMI). In this embodiment this combined controller has a single display coupled and/or movable with respect to the injection molding machine.

According to an embodiment of the invention an injection molding system controller 52 is provided to assist in controlling the operation of the injection molding system. For example, the injection molding system controller 52 may control the operation of the rams 114 and the screw 112. The controller 52 receives signals from the sensors 120 and processes the signals and based on this, it controls the rams 114 and the screw 112, and it may control a robot 123 used to remove molded elements from the mold cavities 124. The controller 52 may include a processing unit 126, a memory 128 which stores among other things, a first operating system OS1 and a user interface 130 that may include a display 132 and an input device, such as a plurality of buttons or a keyboard.

According to an embodiment of the invention a hot runner apparatus controller 136 may be provided for controlling the temperature conditioning elements (e.g. the nozzle heaters) in the hot half 104, and also for controlling the operation of the valve pins 32. The controller 136 includes a processing unit 137, a memory 138 with an operating system OS2, a user interface 139 with a display 140 and an input unit such as a keyboard or buttons.

The controller 136 may receive signals from the sensors 28 relating to processing data. In an embodiment, some of the sensors 28 are positioned to detect the temperature of the molten material at each mold gate 27.

According to an embodiment of the invention the injection molding system controller 52 and the hot runner apparatus controller 136 can be provided as a single unit controller 53 (not shown), where the hot runner controller 136 is built into the injection molding system controller 52. This combined controller is run by a single Operating system. The so called third or additional controller 141 of the invention has access to this controller via wireless communication.

Figure 2:
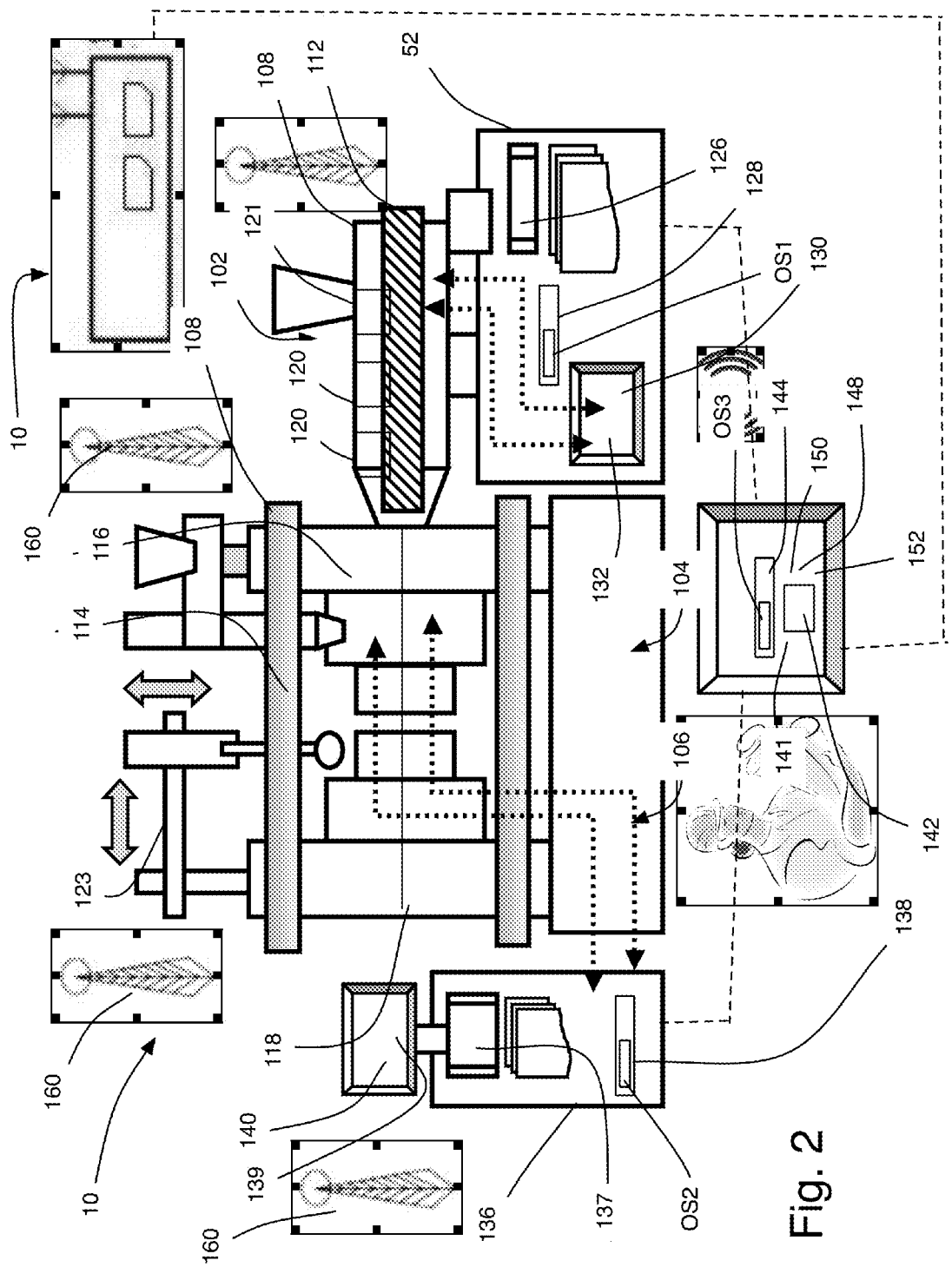
FIG. 2 shows an embodiment of the invention where a third controller is linked to a hot runner controller and an injection molding machine controller. Each controller has its own display.

According to an embodiment of the invention a third controller 141 is provided that is portable and has a processing unit 142, a memory 144 with a third operating system OS3 stored therein, and a user interface 148 that may, for example, include a display 150 and a touch screen 152. The third controller 141 may communicate wirelessly with the controllers 52 and 136. In one embodiment of the invention, the third controller 141 may be used by a person such as a supervisor who walks around a manufacturing facility with the third controller 141 and can control each injection molding system from the third controller 141, without having to walk up to the individual controllers 136 and 52 and operate via the individual controllers 136 and 52. Furthermore, the third controller 141 may receive processing data from the controllers 136 and 52 and may display it for the supervisor. The third controller 141 may be used to send commands to the injection molding machine 102 and the hot runner apparatus 10 [4]. The third controller 141 may be used to receive processing data from two or more injection molding systems simultaneously, or sequentially (see FIGS. 2, 3 and 4, which show an additional system 10 in the upper right corner of the figure). The third controller 141 may receive processing data from two or more injection molding machines simultaneously and may display the data or related data from both simultaneously on display 150 so the supervisor can compare the operations of the two. Similarly, the third controller 141 may receive processing data from two or more hot runner apparatuses simultaneously and may display the data or related data from both simultaneously on display 150 so the supervisor can compare the operations of the two. The third controller 141 may be configured to control parameters of the operation of the system 10 that are different than the parameters that are controllable from the controllers 52 and 136. For example, the third controller 141 may be capable of controlling more parameters than are possible with the controllers 136 and 52 so as to limit the control available to the machine operators relative to the control that the supervisor has.

According to an embodiment of the invention the third controller 141 may be configured alternatively to control less than the controllers 136 and 52. Such a simpler third controller will be used by a person who has a more limited access to the information and the functions of the injection molding system. This can be the case for a service person from a supplier that needs to be protected from making any processing changes. Also this can be the case for a sales person who needs to demonstrate the functions of just a few parts of the injection molding apparatus and that needs to be protected from making any processing changes.

According to an embodiment of the invention the third controller 141 may alternatively be configured to access and/or control some different set of parameters than the controllers 136 and 52. For example, the third controller 141 may be capable of accessing and reviewing historical data that is stored in memory at the controllers 136 and 52, a function that the controllers 136 and 52 may be incapable of carrying out.

Figure 3:
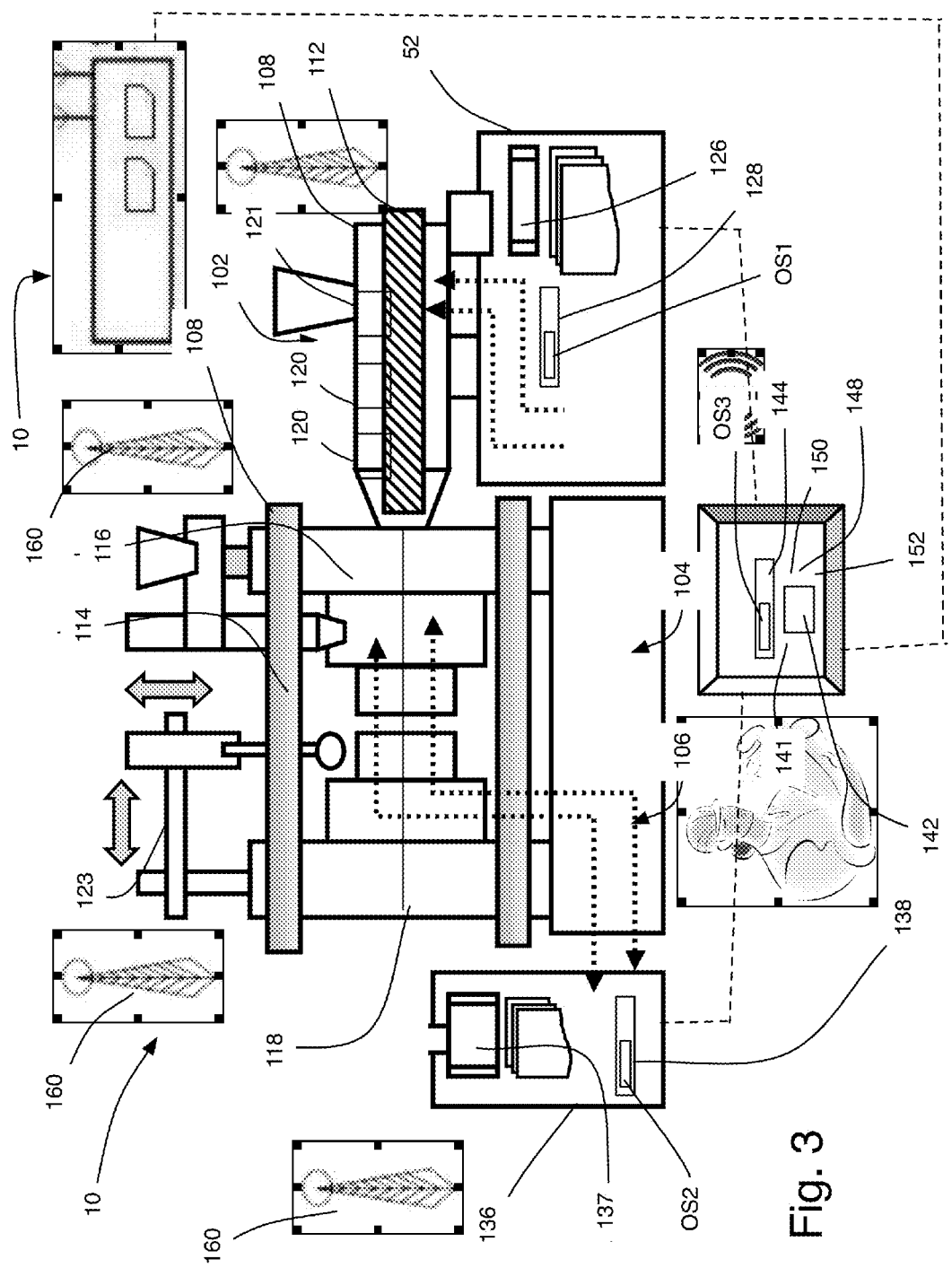
FIG. 3 shows an embodiment of the invention where a third controller is linked to a hot runner controller and an injection molding machine controller. The third controller has its own display while the hot runner controller and the injection molding machine controller use the display of the third controller.

According to an embodiment of the invention the controllers 52 and 136 need not have displays since the third controller 141 has one (see FIG. 3). This third portable controller 141 and having a display to see data and change data provided by and to the controllers 52 and 136 can be located in any suitable area of the injection molding system.

Thus a savings may be had by providing a system 10, with a single display (i.e. display 150) instead of multiple displays.

The controller 52 may be provided by the manufacturer of the injection molding machine. The controller 136 may be provided by the manufacturer of the hot runner apparatus and may be different than controller 52 and OS2 may be entirely different than OS1. The controller 141 may again be provided by yet another manufacturer with yet another different operating system (referred to as OS3) but may be capable of communicating with both controllers 52 and 136, even though they may not able to communicate with each other.

Figure 4:
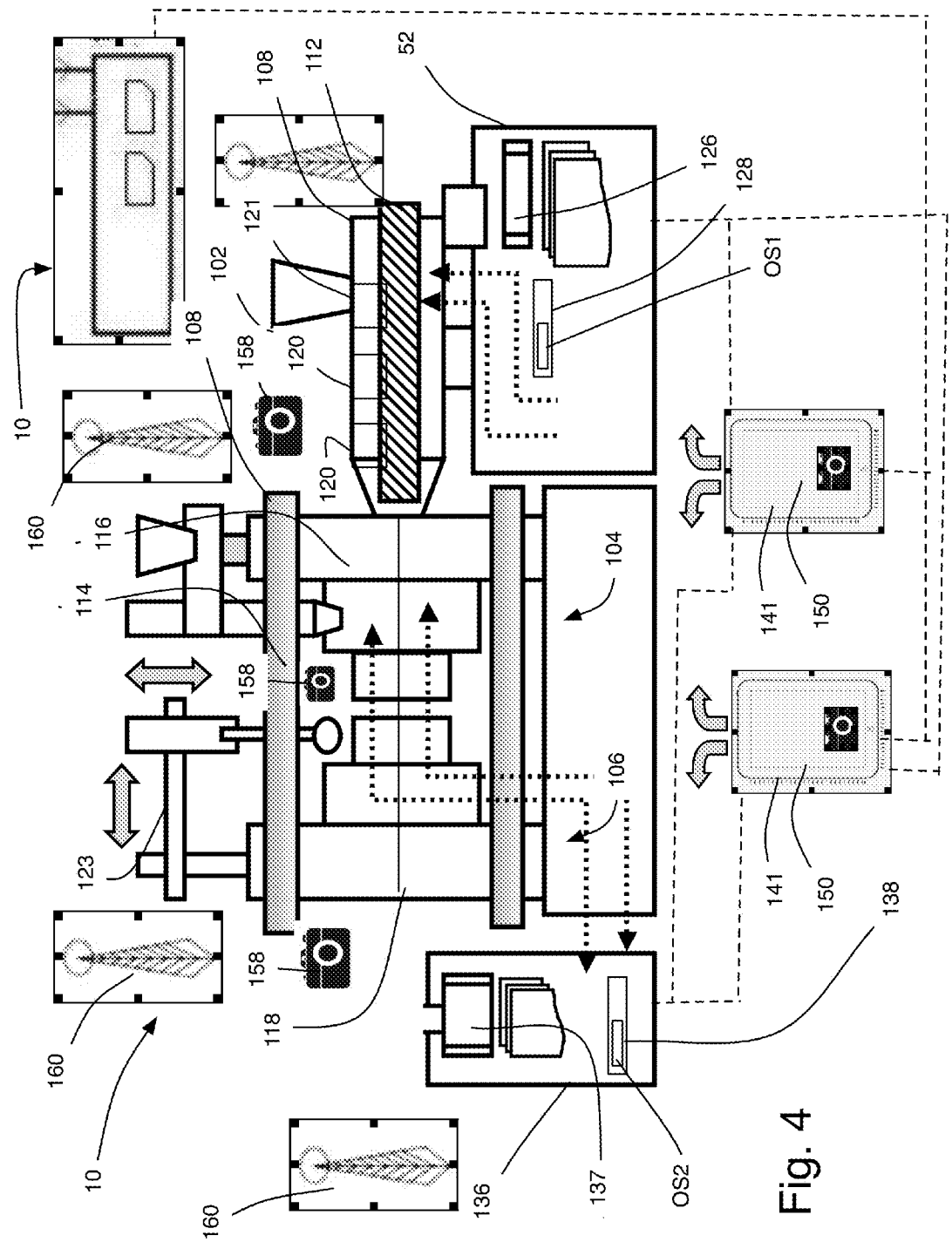
FIG. 4 shows the embodiment of FIG. 3, where additional cameras are used to better collect and control the hot runner system and the production of molded parts.

As shown in FIG. 4, there may be a plurality of controllers 141, so as to permit multiple supervisors to roam a manufacturing facility and see the same or different data relating to one or more systems 10.

Other sensors that may be provided as sensors 28 and/or sensors 120 may include cameras 158 (FIG. 4) that permit a supervisor to see certain aspects of the operation of a system 10 remotely on the display 150 of the controller 141.

Wireless communication between the controller 141 and the controllers 136 and 52 may be carried out using any suitable wireless protocol, such as Bluetooth or Zigbee. Intermediate receiving and transmitting devices (shown at 160 in FIGS. 2, 3 and 4) may be provided to extend the range of wireless communication between the controller 141 and any controllers 136 and 52.

In one embodiment of the invention cameras 158 are coupled to the third controller to allow an operator take pictures and communicate pictures that are not accessible from the fix location of the other cameras.

In one embodiment of the invention the third controller can take over the display functions if the first controller and the second controller in case one or both displays of the first and/or second controller is unable to operate properly.

In one embodiment of the invention the third controller has access to control data provided by hot runner and/or machine controllers manufactured by various makers that have different architectures and that are located in the same injection molding premises. In such a situation the operating system of the third controller has an open communication application that is capable to read data provided by any third party hot runner controller. In the same manner the third controller can be linked to the second machine controllers provided by different manufacturers.

The invention claimed is:

1. A hot runner injection molding system, comprising:
   an injection molding machine comprising an injection unit, a clamping unit, first and second machine platens, a plurality of moving elements, a plurality of injection molding machine temperature conditioning elements, and a plurality of processing sensors;
   a first controller associated with the injection molding machine and configured to receive processing data from the plurality of processing sensors and to provide instructions to least one of the injection unit and the clamping unit, wherein the first controller comprises a first central processing unit, a first memory, a first operating system stored in the first memory, and a first display to monitor the processing data received from the plurality of processing sensors;
   a hot half coupled to the first machine platen, comprising a hot runner apparatus, at least one hot runner nozzle, at least one hot half temperature conditioning element, and at least one hot half processing sensor;
   a cold half coupled to the second machine platen, comprising at least a portion of a mold cavity and a mold cavity temperature conditioning element, wherein the at least a portion of the mold cavity is capable of receiving molten material from the injection unit through the at least one hot runner nozzle;
   a second controller associated with the hot half and configured to receive hot half processing data from the at least one hot half processing sensor and to provide instructions to the at least one hot half temperature conditioning element, wherein the second controller is physically separated and independently operated from the first controller, and wherein the second controller comprises a second central processing unit, a second operating system, a second memory, and a second display to monitor hot half processing data received from the at least one hot half processing sensor;
   a third controller comprising a third central processing unit, a third memory, a third display, and a user interface, wherein the third controller is configured to communicate wirelessly with both the first and second controllers to access processing data from each controller, display at least some of the processing data on the third display, and provide process operating data and processing commands to the first and second controllers to control the flow of molten material from the injection molding machine through the hot half and into the cold half;
   wherein the third controller is configured to access or control a different set of parameters than the first and second controllers.

2. The hot runner injection molding system of claim 1, wherein the at least one hot runner nozzle comprises one or more valve pins that may be moved to control the flow of molten material through the at least one hot runner nozzle, and wherein the second controller is configured to provide instructions to move the one or more valve pins.

3. The hot runner injection molding system of claim 2, wherein the second controller controls the position of each of the one or more valve pins based on signals from the at least one hot half processing sensor.

4. The hot runner injection molding system of claim 3, wherein the second controller is operable by an operator to move any of the one or more valve pins during a molding cycle.

5. The hot runner injection molding system of claim 2, wherein the at least one hot half processing sensor provides information to the second controller about the location of the one or more valve pins.

6. The hot runner injection molding system of claim 1, wherein the processing data includes one or more of: temperature, pressure, friction, stress.

7. The hot runner injection molding system of claim 1, wherein the plurality of processing sensors are configured to sense one or more of: temperature, pressure, friction, stress.

8. The hot runner injection molding system of claim 1, wherein the at least one hot runner nozzle comprises one or more valve pins that may be moved to control the flow of molten material through the at least one hot runner nozzle, and wherein the first controller is configured to provide instructions to move the one or more valve pins.

9. The hot runner injection molding system of claim 2, wherein the first controller controls the position of each of the one or more valve pins based on signals from the plurality of processing sensors.

10. The hot runner injection molding system of claim 9, wherein the first controller is operable by an operator to move any of the one or more valve pins during a molding cycle.

11. The hot runner injection molding system of claim 1, wherein the third controller is configured to access historical data stored in either the first memory or the second memory, and the first and second controllers are configured to prevent access to the historical data stored in either the first memory or second memory.

12. The hot runner injection molding system of claim 1, wherein the third controller is configured to provide processing commands to the first and second controllers that override the instructions provided by either the first controller or the second controller.

13. The hot runner injection molding system of claim 1, wherein the third controller is configured to prevent the processing commands provided to the first and second controllers from making any processing changes.

14. The hot runner injection molding system of claim 1, wherein the third controller is configured as a fail-safe controller in the event that either the first controller or the second controller has a failure, and is thus configured to receive processing data from the plurality of processing sensors and to provide instructions to least one of the injection unit and the clamping unit and to receive hot half processing data from the at least one hot half processing sensor and to provide instructions to the at least one hot half temperature conditioning element, wherein the third display is configured to monitor the processing data received from the plurality of processing sensors and to monitor hot half processing data received from the at least one hot half processing sensor.

15. A hot runner injection molding system, comprising:
   an injection molding machine comprising an injection unit, a clamping unit, first and second machine platens, a plurality of moving elements, a plurality of injection molding machine temperature conditioning elements, and a plurality of processing sensors;
   a first controller associated with the injection molding machine and configured to receive processing data from the plurality of processing sensors and to provide instructions to least one of the injection unit and the clamping unit, wherein the first controller comprises a first central processing unit, a first memory, a first operating system stored in the first memory;

a hot half coupled to the first machine platen, comprising a hot runner apparatus, at least one hot runner nozzle, at least one hot half temperature conditioning element, and at least one hot half processing sensor;

a cold half coupled to the second machine platen, comprising at least a portion of a mold cavity and a mold cavity temperature conditioning element, wherein the at least a portion of the mold cavity is capable of receiving molten material from the injection unit through the at least one hot runner nozzle;

a second controller associated with the hot half and configured to receive hot half processing data from the at least one hot half processing sensor and to provide instructions to the at least one hot half temperature conditioning element, wherein the second controller is physically separated and independently operated from the first controller, and wherein the second controller comprises a second central processing unit, a second operating system, a second memory;

a third controller comprising a third central processing unit, a third memory, a third display unit, and a user interface, wherein the third controller is configured to communicate wirelessly with both the first and second controllers to access processing data from each controller, display at least some of the processing data on the third display, and provide process operating data and processing commands to the first and second controllers to control the flow of molten material from the injection molding machine through the hot half and into the cold half;

wherein the third controller is configured to access or control a different set of parameters than the first and second controllers, and wherein either of the first and second controllers does not have a display.

16. The hot runner injection molding system of claim 15, wherein both of the first and second controllers do not have a display.

17. The hot runner injection molding system of claim 15, wherein the third controller is configured to access historical data stored in either the first memory or the second memory, and the first and second controllers are configured to prevent access to the historical data stored in either the first memory or second memory.

18. The hot runner injection molding system of claim 15, wherein the third controller is configured to provide processing commands to the first and second controllers that override the instructions provided by either the first controller or the second controller.

19. The hot runner injection molding system of claim 15, wherein the third controller is configured to prevent the processing commands provided to the first and second controllers from making any processing changes.

20. The hot runner injection molding system of claim 15, wherein the third controller is configured as a fail-safe controller in the event that either the first controller or the second controller has a failure, and is thus configured to receive processing data from the plurality of processing sensors and to provide instructions to least one of the injection unit and the clamping unit and to receive hot half processing data from the at least one hot half processing sensor and to provide instructions to the at least one hot half temperature conditioning element, wherein the third display is configured to monitor the processing data received from the plurality of processing sensors and to monitor hot half processing data received from the at least one hot half processing sensor.

* * * * *